United States Patent
Lemieux

[15] 3,678,784
[45] July 25, 1972

[54] AUTOMOTIVE TRANSMISSION MECHANISM HAVING FOUR FORWARD DRIVING SPEED RATIOS

[72] Inventor: George E. Lemieux, Livonia, Mich.
[73] Assignee: Ford Motor Company, Dearborn, Mich.
[22] Filed: Oct. 29, 1970
[21] Appl. No.: 85,014

[52] U.S. Cl. ..................................................74/759
[51] Int. Cl. ........................F16h 3/44, F16h 57/10
[58] Field of Search..................................74/759

[56] References Cited

UNITED STATES PATENTS

3,523,468   8/1970   Kepner ..............................74/759
2,971,385   2/1961   Miller ............................74/759 X
3,101,012   8/1963   Christenson et al. ............74/759 X

Primary Examiner—Leonard H. Gerin
Attorney—John R. Faulkner and Donald J. Harrington

[57] ABSTRACT

A four-speed ratio power transmission for use in an automotive vehicle driveline including two simple planetary gear units and a compound planetary gear unit, the reaction element for the simple planetary gear units serving as a power input element for the compound planetary gear unit whereby a split torque delivery path is established through said transmission during low speed ratio operation, said input element for the compound planetary gear unit serving as a reaction element during second speed ratio operation, the compound planetary gear unit being situated in a separate housing whereby the transmission structure may be converted to a three-speed ratio transmission.

6 Claims, 8 Drawing Figures

Fig1-B 3,678,784

AUTOMOTIVE TRANSMISSION MECHANISM HAVING FOUR FORWARD DRIVING SPEED RATIOS

GENERAL DESCRIPTION OF THE INVENTION

The improvements of my invention are adapted especially to be used in an automatic power transmission mechanism for automotive vehicle drivelines. Such transmission mechanisms usually include a hydrokinetic torque converter having an impeller driven by the vehicle engine and a turbine which serves as a torque input member for a planetary gear system capable of providing three forward driving speed ratios and a single reverse speed ratio. The magnitude of the ratios and their spacing are chosen to satisfy particular operating conditions in a driveline, but the transmission mechanism may be adapted to satisfy the operating requirements of a different driveline without requiring modifications to the basic transmission mechanism.

My invention includes a compound planetary gear unit situated wholly within an auxiliary transmission housing which may be secured to the main transmission housing for the basic gear elements of a driveline having three forward driving speed ratios. The gear elements of the compound planetary gear unit and the gear elements of the main transmission assembly are brought into structural cooperation to produce an additional underdrive ratio to effect maximum torque multiplication. This low speed ratio may be used with the three forward driving ratios obtained with the basic gear system to provide four operating ratios thereby extending the torque multiplication range. No design changes are required in the basic transmission structure to adapt it for use with the compound planetary gearing. A maximum degree of interchangeability thus is achieved so that the basic manufacturing tooling required to manufacture the three-speed ratio transmission mechanism can be used as well to manufacture my improved four speed ratio transmission mechanism.

During operation in the low speed ratio, two torque delivery paths are established through the simple planetary gearing. Thus torque is distributed to the output member of the transmission from one output element of the simple planetary gear unit and the other output element of the simple planetary gear unit is connected to the input element of the compound planetary gearing. A reverse motion occurs in the compound planetary gearing so that the effective output member of the compound planetary gearing is capable of contributing driving torque to the output member.

PARTICULAR DESCRIPTION OF THE INVENTION

Figure 1:
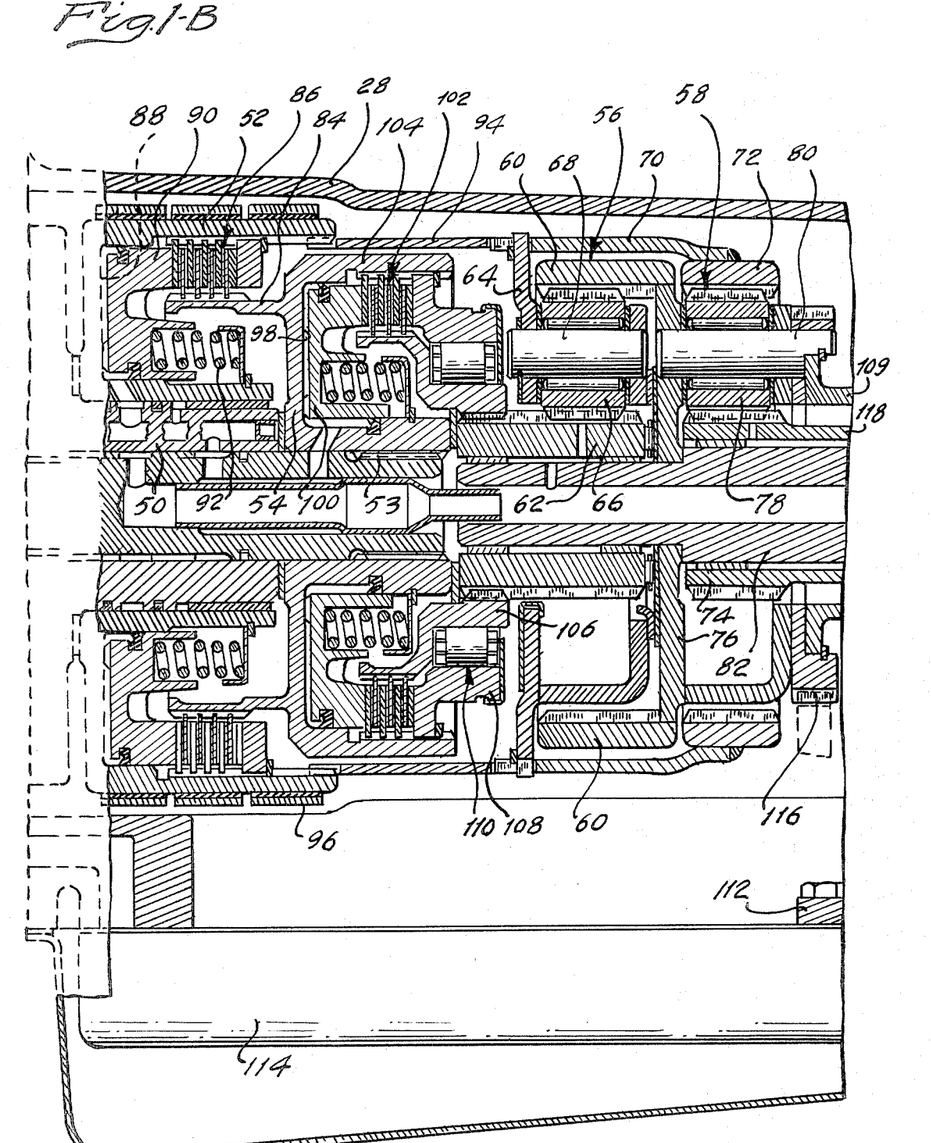
FIGS. 1A, 1B and 1C show in cross sectional form, an assembly view of a power transmission mechanism embodying the improvements of my invention.
Figure 1A:
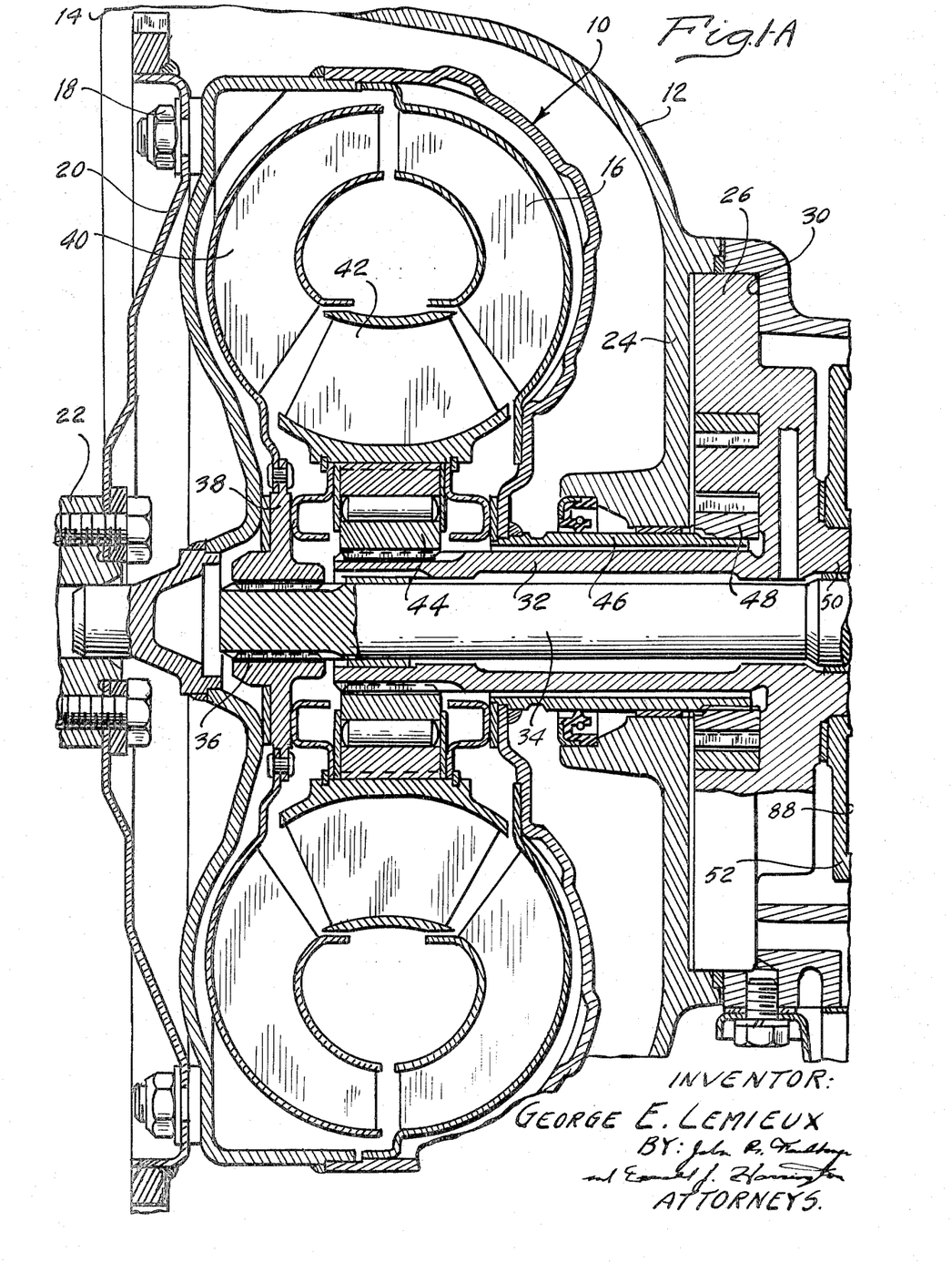

Numeral 10 designates a hydrokinetic torque converter and numeral 12 designates a bell housing in which converter 10 is situated. The bell housing 12 may be connected at its margin 14 to the engine block of an internal combustion engine for an automotive vehicle.

Converter 10 includes an impeller 16 which is connected drivably at 18 to driveplate 20, which in turn is drivably connected to the crankshaft 22 of the internal combustion engine.

Housing 12 includes a wall 24 to which is secured pump housing 26. The main transmission housing 28 is secured to the wall 24 and is formed with a shoulder 30 against which the pump housing 26 is positioned.

Stationary sleeve shaft 32 forms an extension of the pump housing 26. It surrounds the turbine shaft 34, which is splined at 36 to the hub 38 of the turbine 40. Turbine 40 is situated in toroidal fluid-flow relationship with respect to the impeller 16.

A bladed stator 42 is located between the flow exit region of the turbine 40 and the flow entrance region of the impeller 16. It has a bladed section which is mounted on an overrunning brake 44, the inner race of which is secured to stationary sleeve shaft 32.

The impeller 16 has a hub shaft 46 which is journaled within a central opening formed in the wall 24. Shaft 46 is drivably connected to a driving gear 48 of a positive displacement gear pump. This serves as a pressure source for an automatic control valve system used for controlling ratio changes.

A stationary support sleeve 50 is formed integrally on the pump housing 26. A clutch and brake drum 52 is journaled on the sleeve 50.

Shaft 34 is journaled within the sleeve 50 and is splined at 53 to clutch member 54.

A pair of simple planetary gear units is shown at 56 and 58. Gear unit 56 includes a ring gear 60, sun gear 62, carrier 64 and planet pinions 66 journaled rotatably on pinion shafts 68, which in turn are supported by carrier 64. Carrier 64 is connected drivably to a drive ring 70 connected to ring gear 72 which forms a part of gear unit 58. Gear unit 58 includes also sun gear 74, planet carrier 76 and planet pinions 78 journaled rotatably on pinion shafts 80 which form a part of carrier 76. Carrier 76 is connected directly to the ring gear 60. It is connected also directly to power output shaft 82.

Clutch member 54 includes an externally splined extension 84 which carries internally splined clutch discs. These are arranged in registry with externally splined clutch discs carried by an internally splined portion of the clutch and brake drum 52. The clutch discs form a multiple disc clutch assembly which is identified generally by reference character 86.

Drum 52 defines an annular cylinder 88 within which is received an annular piston 90. Piston 90 normally is urged to a clutch disengaging position by return spring 92. The piston and the cylinder cooperate to define a pressure chamber which, when pressurized, causes the piston 90 to engage frictionally the clutch disc 86 to form a driving connection between turbine shaft 34 and drum 52. Drum 52 is connected drivably to torque transfer shell 94, which in turn distributes torque directly to ring gear 70 and sun gear 72 as well as carrier 64.

Drum 52 is surrounded by friction brake band 96 which may be applied and released by a fluid pressure operated servo, not shown in FIGS. 1A and 1B. The servo is described in general, however, with reference to the schematic drawing of FIG. 4.

Clutch member 54 defines also a second annular cylinder 98 within which is positioned annular piston 100. When the annular cylinder is pressurized, piston 100 establishes a frictional driving connection between externally splined clutch discs and internally splined clutch discs of a forward disc clutch assembly 102. The externally splined clutch discs are carried by an internally splined portion 104 of the member 54. The internally splined clutch discs are carried by clutch member 106, which is splined directly to sun gear 62.

A reaction ring 108 connected to the portion 104 serves as an outer race for an overrunning coupling 110. The inner race for the coupling 110 is defined by clutch member 106. Overrunning coupling 110 is adapted to deliver torque from turbine shaft 34 to sun gear 62 during operation in the low speed ratio and the next to the lowest speed ratio as well as during reverse drive operation. A multiple disc clutch 102 is in parallel disposition with respect to the overrunning coupling 110 and is adapted to transfer torque in two directions.

The carrier 76 and planet pinion shaft 80 are connected to a governor drive gear in the form of a sleeve shaft 108. The sleeve shaft is formed with teeth having a high helix angle. These teeth drivably engage a worm gear 110 mounted for rotation upon an axis that is transversely disposed with respect to the axis of power output shaft 82.

Gear 110 may be supported by a pedestal 112 secured to the upper surface of a valve body 114 which contain the automatic control valve elements for controlling engagement and release on the clutches and the brakes. Gear 110 may be connected to a flyweight governor mechanism which in turn is used to establish a fluid pressure signal for the valve elements in the valve body 114.

Situated adjacent the gear 110 and the gear unit 58 is a parking gear 116. This is secured directly to the carrier 76. Gear 116 thus rotates in unison with the power output shaft 82.

The gear 116 may be engaged by a parking pawl pivoted on the transmission housing 28. It thereby locks the power output shaft 82 against rotation. Usually parking gears in automatic transmissions for automotive vehicle drivelines are located in a tailshaft extension housing, which increases the longitudinal dimensions of the transmission assembly. A fluid pressure governor of conventional transmission mechanisms also is located in the main transmission housing directly behind the simple planetary gear units. My improved construction makes it possible to reduce complexity in the fluid circuitry since the fluid pressure governor and the governor pressure signal passages are located directly in registry with cooperating passages in the valve body 114.

Figure 1C:
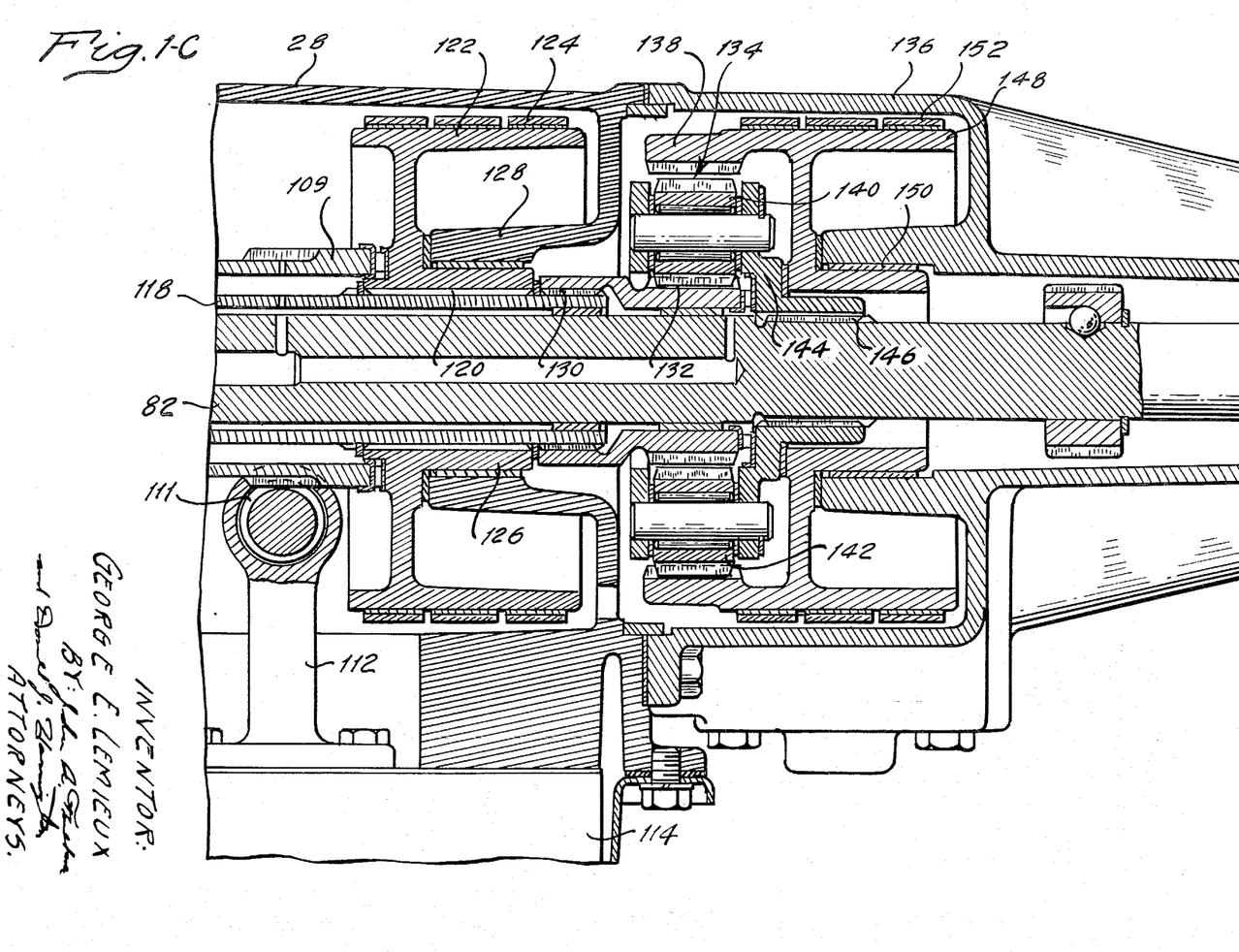

Sun gear 74 is connected to or formed integrally with sleeve shaft 118. This in turn is splined at 120 to brake drum 122. Brake band 124 surrounds the drum 122. It may be applied and released by a fluid pressure operated motor thereby anchoring and releasing the brake drum 122. The drum 122 is formed with a hub 126 which is journaled rotatably in a bearing opening formed in end wall 128 of the housing. The end of sleeve shaft 118 is splined at 130 to sun gear 132 of a compound planetary gear unit 134. This is located within an extension housing 136 which may be bolted to the rear side of the main transmission housing 28.

Compound planetary gear unit 134 includes, in addition to the sun gear 132, a ring gear 138, a first set of planet pinions 140, a second set of planet pinions 142 and a common carrier 144 for the sets of planet pinions 140 and 142. Planet pinions 140 and 142 drivably engage each other. Planet pinions 142 drivably engage ring gear 138 and planet pinions 140 drivably engage sun gear 132.

Carrier 144 is splined directly to power output shaft 82 at 146.

Ring gear 138 is connected to or formed integrally with brake drum 148. This is journaled within opening 150 formed in a bearing support wall of the extension housing 136. The end of shaft 82 protrudes from the end of extension housing 136 to permit a driving connection through a universal joint with the vehicle driveshaft which in turn is connected drivably to the differential-and-axle assembly for the vehicle traction wheels.

Brake band 152 surrounds the drum 148. It may be applied and released by a fluid pressure operated brake motor to anchor the ring gear 138 during operation in the low speed ratio.

Figure 3:
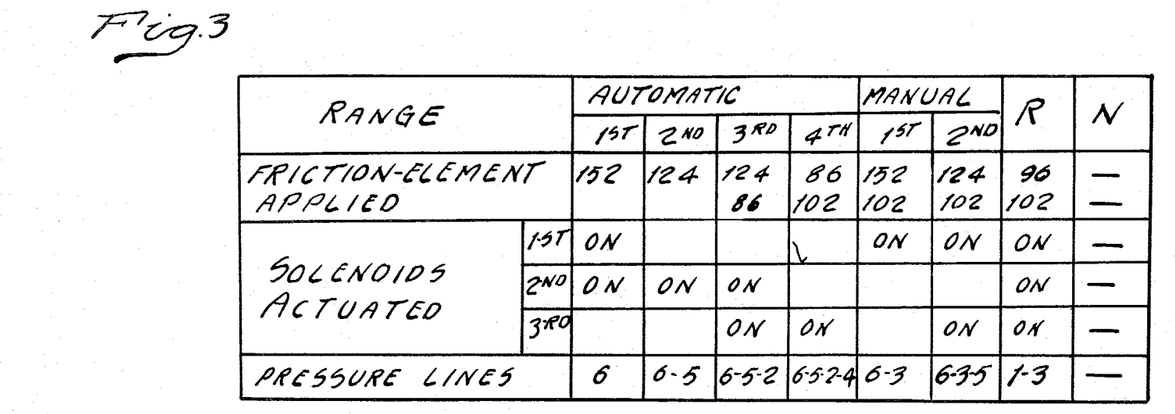
FIG. 3 is a chart showing the clutch and brake engagement and release pattern for the transmission of FIGS. 1A, 1B, 1C and 2.

In FIG. 3, I have indicated a clutch and brake engagement and release pattern to permit transmission operation in each of the four forward-driving speed ratios and a single reverse speed ratio. During operation of the lowest speed ratio, brake 152 is applied. Clutch 102 may also be applied if manual ratio changes are to be accomplished or if the transmission is to be conditioned for coasting operation or hill braking while it is in the low speed ratio drive or in any circumstances when torque is delivered from shaft 34 to the sun gear 62. This imparts a forward driving torque to the sun gear 62, which in turn results in a forward driving torque on the carrier 64 where reverse driving torque is imparted to the ring gear 60 which causes a reverse torque to be transmitted to sun gear 74. Ring gear 138 is anchored at this time. Thus a forward driving torque is imparted to the carrier 144 for the compound planetary gear unit which forward driving torque is distributed directly to the output shafts 82. This torque combines with a positive driving torque distributed to the power output shaft 82 by the sun gear 60.

If a speed ratio change to the next lowest speed ratio is desired, it merely is necessary to apply brake 124 as brake 152 becomes released. This anchors the sun gear 74 so that it may function as a reaction point. The compound planetary gear unit under these conditions is inactive, and a positive driving torque is distributed to the sun gear 62 from the turbine shaft 34 thus imparting a positive driving torque on the carrier 64 and the ring gear 72. The ring gear torque on gear unit 58 is multiplied and distributed to the output shaft 82.

To condition the mechanism for operation in the third speed ratio, clutch 86 becomes applied thereby allowing turbine torque to be distributed directly to the ring gear 72. Gear unit 58 now is the sole torque multiplication unit. Sun gear 62 freewheels, and since brake 152 is released the compound planetary gear unit remains inactive. With the sun gear 74 serving as a reaction point, the ring gear torque on gear unit 58 is multiplied and distributed to the output shaft 82.

Fourth speed ratio operation is achieved by releasing the brakes and applying clutches 86 and 102 simultaneously. This locks up the gear system for rotation in unison.

Reverse drive is achieved by applying the brake 96 and clutch 102 simultaneously while the other brakes and clutches are released. The forward driving torque imparted to the ring gear 60 cause a reverse rotation of the carrier 76 and the output shaft 82, although an opposing torque is distributed to the ring gear 72. Sun gear 74 acts as a reaction point at this time.

Figure 4:
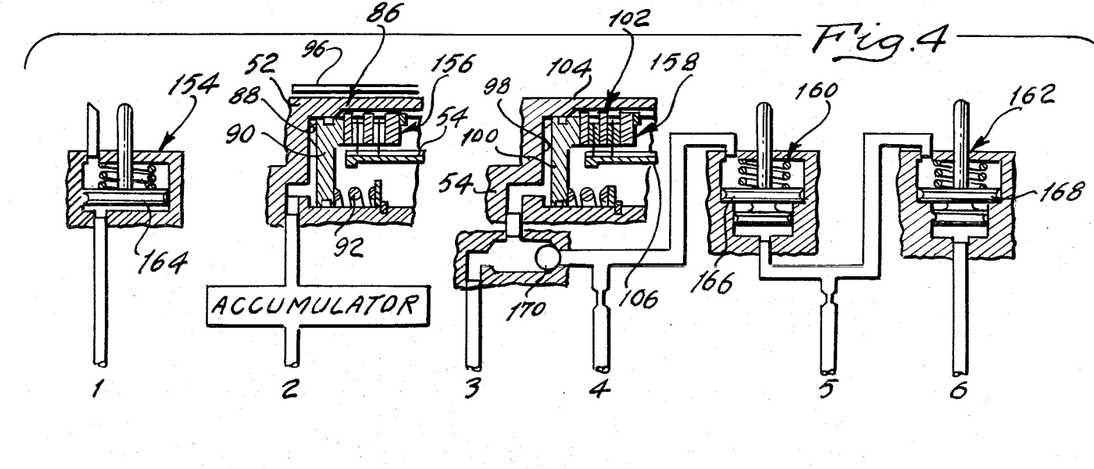
FIG. 4 is a schematic diagram of a portion of the hydraulic valve circuit controlling engagement and release of the clutches and brakes for the transmission of FIGS. 1A, 1B, 1C and 2.

In FIG. 4, I have illustrated fluid pressure operated motors for engaging and releasing the fluid motor used for applying the brake 154, the fluid motor for applying clutch 156, the fluid motor for applying clutch 158, the fluid motor for applying brake 160 and the fluid motor for applying brake 162. Motors 156 and 158 include annular pistons 90 and 100 respectively. Brake motors 154, 160 and 162 include fluid pressure operated pistons 164, 166 and 168 respectively. Fluid pressure is distributed to one side of the piston 164 to pressure passage number 1. Fluid pressure is distributed to the apply side of the brake piston 166 and to the release side of the brake piston 168 through pressure passage number 5. Fluid pressure is distributed to the apply side of piston 168 through pressure passage number 6.

Fluid pressure is distributed to the apply side of clutch piston 100 and to the release side of the brake piston 166 through pressure passage number 4. Pressure is distributed to the apply side of clutch piston 100 through pressure passage number 3 and fluid pressure is distributed to the apply side of clutch piston 90 through pressure passage number 2. Pressure passage 4 is isolated from pressure passage 3 by a one-way check valve 170. When passage number 4 is pressurized, the valve 170 will permit a pressure to be distributed to the apply side of clutch piston 100 as well as to the release side of the brake piston 166 so that the clutch piston becomes applied in synchronism with the release of the brake piston 166. Similarly, since the apply side of the motor 160 and the release side of the motor 162 are connected to the common pressure passage number 5, the brake 124 becomes applied whenever the brake 152 becomes released.

It is apparent from the foregoing that ratio changes starting with the lowest ratio and ending with the direct-drive, high-speed ratio are accomplished by sequentially pressurizing the pressure passages 1 through 6. Initially the pressure passage 6 is pressurized when the vehicle first begin to accelerate from a standing start. Thereafter the increasing speeds are achieved by progressively pressurizing the other passages. As each additional passage becomes pressurized, another ratio change occurs. Sequencing in the application and release of pressure from the various passages is noted in the last column of the diagram of FIG. 2.

Initially passage 6 is pressurized. Upon an upshift to the next highest ratio, passage 6 remains pressurized while passage 5 becomes pressurized. The next ratio change is achieved by distributing pressure to passage number 2 while previously pressurized passages 6 and 5 remain pressurized. Finally, the direct drive high speed ratio is achieved by pressurizing passage 4 while the previously pressurized passages 6, 5 and 2 remain pressurized.

If manual operation is desired at the time clutch 102 becomes operative, the low speed ratio is achieved by engaging simultaneously pressure passages 6 and 3. A ratio change to the next lowest speed ratio is achieved merely by pressurizing passage 5 while passages 6 and 3 continue to be pressurized.

Figure 5:
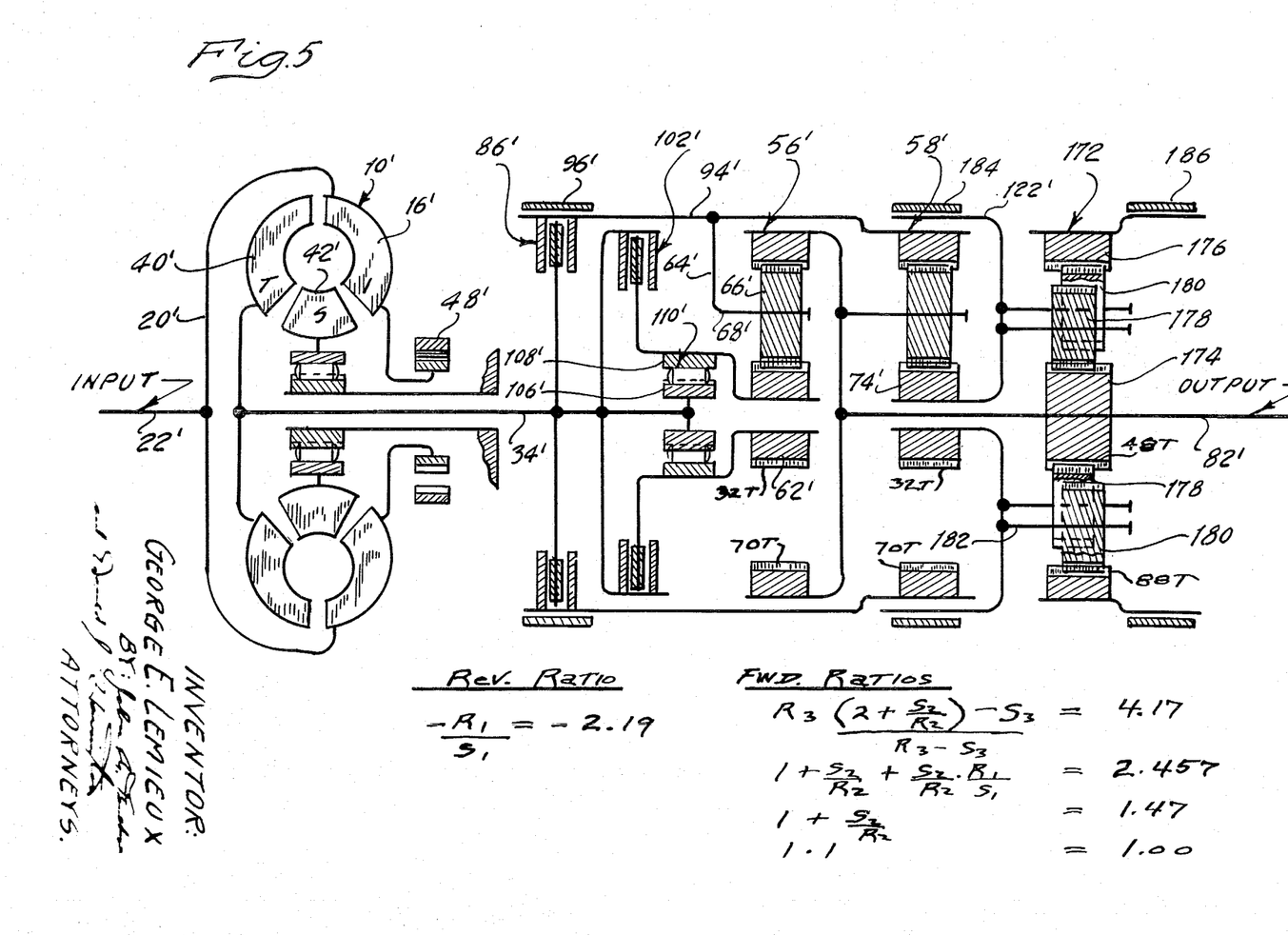
FIG. 5 is a schematic representation of an alternate embodiment of my invention.

In FIG. 5 is shown in schematic form a transmission mechanism having simple planetary gear units similar to those shown at 56 and 58 in the embodiment of FIGS. 1A and 1B. For purposes of comparison of the FIG. 5 embodiment with the FIGS. 1A and 1B embodiment, I have designated the elements in FIG. 5 with similar reference characters although prime notations are added.

The power output element for the gear unit 58' is connected directly to the power output shaft 82'. Instead of a compound planetary gear unit such as that shown at 134 in the FIGS. 1A and 1B embodiment, I have used instead in the FIG. 5 embodiment a compound planetary gear unit 172. This includes a sun gear 174, a ring gear 176, two sets of planet pinions 178 and 180 and a compound carrier 182 which journals each set of planet pinions 178 and 180. Planet pinions 180 engage drivably ring gear 176 and planet pinions 178 engage drivably sun gear 174. Pinions 178 and 180 also engage each other. Carrier 182 is adapted to be anchored by a selectively engageable friction brake 184. Ring gear 176 is adapted to be anchored by friction brake 186.

Brakes 184 and 172 correspond respectively to brakes 124 and 152 in the embodiments of FIGS. 1A and 1B. That is, brake 172 is engaged during operation of the lowest speed ratio and brake 124 is engaged during operation in the next lowest speed ratio.

The carrier 182 serves as a power input member for the compound planetary gear unit 176. In this respect it is unlike the compound planetary gear unit 134 in the embodiment of FIGS. 1A and 1B where the sun gear 132 acts as a power input element and the carrier 144 acts as a power output element. In each instance, however, the torque acting on the output sun gear of the second simple planetary gear unit is reversed by the compound planetary gearing so that the output torque of the compound planetary gear unit is adapted to contribute to the driving torque applied to the output shaft 82'. This torque reversing occurs only during operation in the lowest speed ratio.

Shown also in FIG. 5 are representative values for the number of teeth in the gear units and the corresponding speed ratios that would be available for a transmission having gears with those numbers of the teeth.

The reverse ratio in the compound planetary gear unit 172 in the FIG. 5 embodiment and in the compound planetary gear unit 134 in the embodiment of FIGS. 1A and 1B may be made exactly equal to 1 to 1, although this can be changed if a different ratio spacing is desired.

Figure 2:
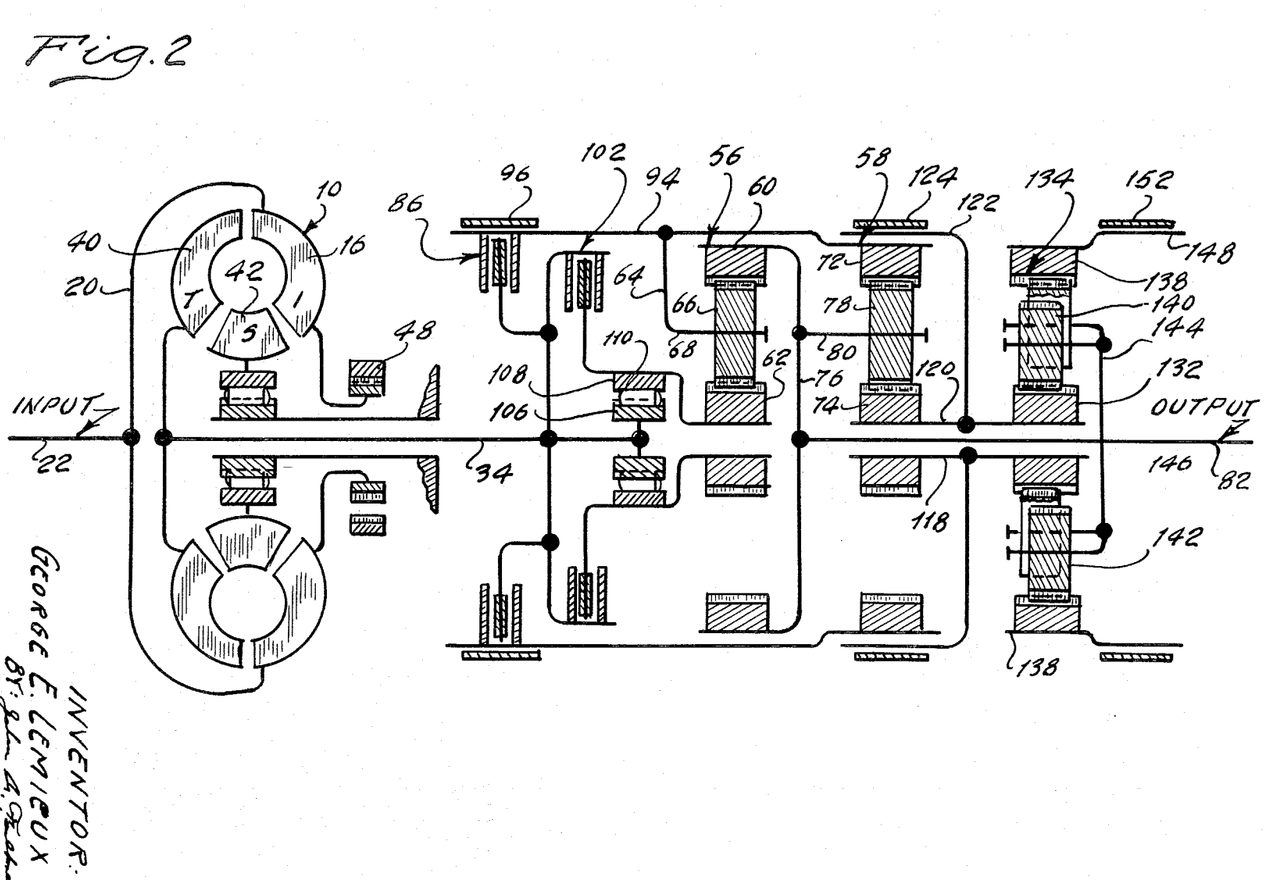
FIG. 2 is a schematic presentation of the transmission of FIGS. 1A, 1B and 1C.
Figure 6:
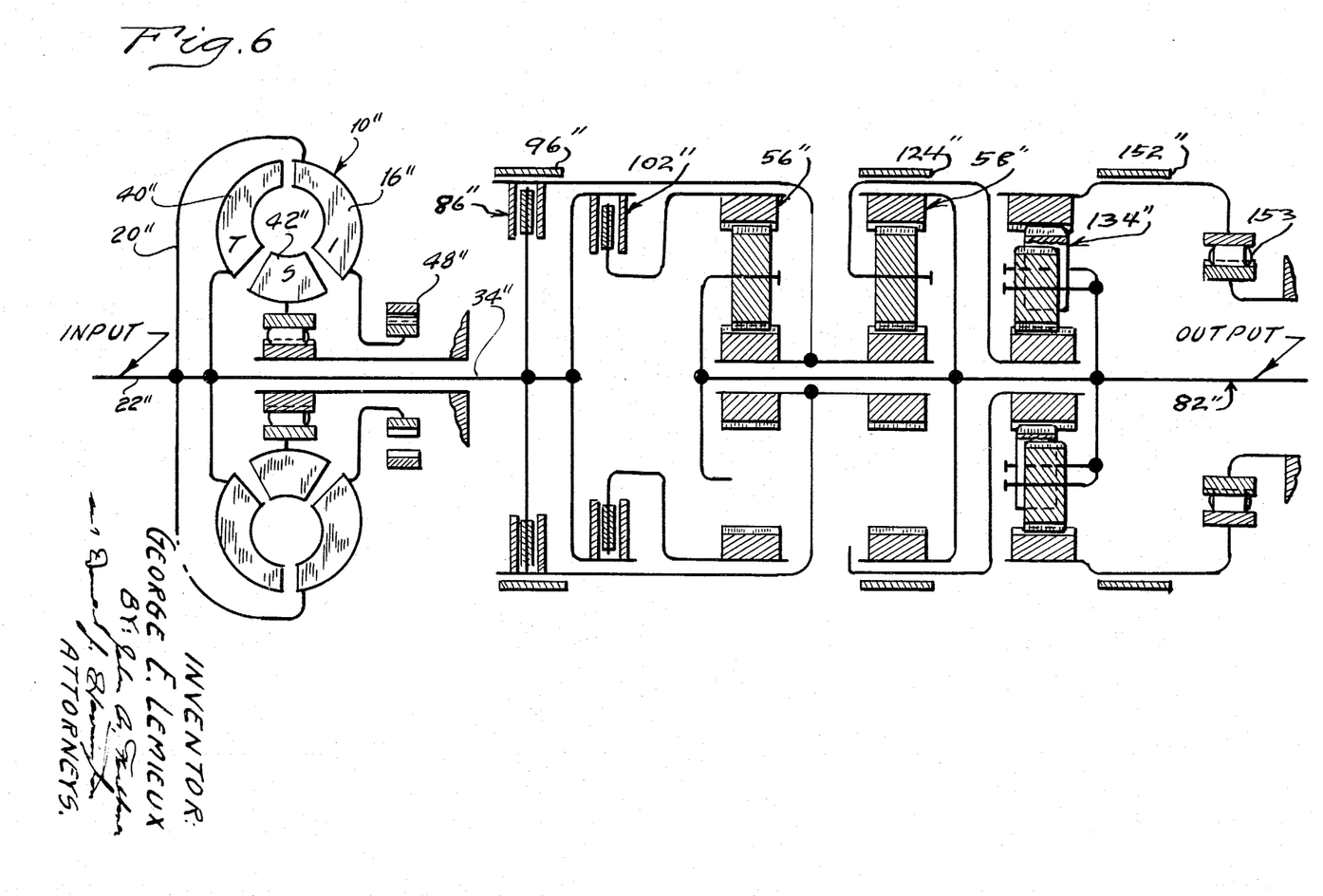
FIG. 6 is a schematic representation of a second alternate embodiment of my invention.

The embodiment of FIG. 6 uses a compound planetary gear unit 134" similar to gear unit 134 of FIG. 2. The other two gear units 58" and 56" of FIG. 6 differ from the corresponding gear units 58 and 56 of FIG. 2, but their functions are similar. That is, the reaction torque on the reaction element of the second gear unit 58", which is the carrier in the FIG. 6 embodiment rather than the sun gear as in the FIG. 2 embodiment, is distributed to the input sun gear of the gear unit 134" during low speed ratio operation. The torque is reversed by gear unit 134" and distributed to output shaft 82" just as the reaction torque is reversed by gear unit 134 in the FIG. 2 embodiment. The clutches and brakes in FIG. 6 have the same function as that of the clutches and brakes of FIG. 2 and for that reason they are identified by similar reference characters although double prim notations are added. Overrunning brake 153 complements brake 152" by providing a pick-up shift from the low ratio to the second ratio. Brake 152" then may be used only to absorb reverse reaction torque.

The operating sequence for the clutches and brakes of FIG. 6 during the various ratio changes for the four forward driving ratios and the single reverse ratio is the same as that previously described with reference to FIG. 2.

What I claim is:

1. A multiple ratio power transmission mechanism comprising first planetary gearing having a power input element and a power output element, a driven shaft connected to said power output element, clutch means and brake means for controlling relative motion of the elements of said gearing, a first reaction element of said gearing being anchored by said brake means during a first underdrive operation, a second reaction element of said gearing being anchored during operation in another underdrive ratio, a compound planetary gear unit having a power input element connected to said first reaction element and a power output element connected to said driven shaft, additional brake means for anchoring a reaction element of said compound planetary gear unit during operation in a low underdrive speed ratio, said compound planetary gear unit including two sets of planetary gear elements, the gear elements of each set engaging each other whereby said compound planetary gear unit reverses the direction of the torque applied to the input element thereof as the torque applied to the output element thereof complements the torque distributed to said driven shaft through said planetary gearing.

2. The combination set forth in claim 1 wherein said compound planetary gear unit includes a sun gear, a ring gear, a first set of planet pinions engageable with said sun gear and a second set of planet pinions engageable with said ring gear and with said first planet pinions, a common carrier for journaling said planet pinions, said carrier being connected to said driven shaft, said sun gear being connected to said first reaction element of said planetary gearing, auxiliary brake means for anchoring the ring gear of said compound planetary gear unit during low speed ratio operation.

3. The combination set forth in claim 1 wherein said planetary gearing comprises a pair of simple planetary gear units, each gear unit comprising a ring gear, a sun gear, a carrier and planet pinions journaled on said carrier in meshing engagement with the sun and ring gears, first clutch means for connecting selectively said power input element to the ring gear of one simple planetary gear unit, second clutch means for connecting said power input element to the sun gear of the other set of planetary gear units and brake means for selectively anchoring the sun gear of said one simple planetary gear unit during intermediate speed ratio operation, said sun gear of said one planetary gear unit corresponding to said first reaction element.

4. The combination set forth in claim 2 wherein said planetary gearing comprises a pair of simple planetary gear units, each gear unit comprising a ring gear, a sun gear, a carrier and planet pinions journaled on said carrier in meshing engagement with the sun and ring gears, first clutch means for connecting selectively said power input element to the ring gear of one simple planetary gear unit, second clutch means for connecting said power input element to the sun gear of the other set of planetary gear units and brake means for selectively anchoring the sun gear of said one simple planetary gear unit during intermediate speed ratio operation, said sun gear of said one planetary gear unit corresponding to said first reaction element.

5. The combination set forth in claim 1 wherein said compound planetary gear unit comprises a ring gear, a sun gear, a carrier, two sets of planet pinions journaled on said carrier, one set of planet pinions engaging said sun gear and the other of said planet pinions engaging said ring gear, the planet pinions of each set engaging each other, said first reaction element being connected to the carrier of said simple planetary gear unit, said sun gear being connected to said driven shaft and auxiliary brake means for anchoring the ring gear of said compound planetary gear unit during low speed ratio operation.

6. The combination set forth in claim 3 wherein said compound planetary gear unit comprises a ring gear, a sun gear, a carrier, two sets of planet pinions journaled on said carrier, one set of planet pinions engaging said sun gear and the other of said planet pinions engaging said ring gear, the planet pinions of each set engaging each other, said first reaction element being connected to the carrier of said simple planetary gear unit, said sun gear being connected to said driven shaft and auxiliary brake means for anchoring the ring gear of said compound gear unit during low speed ratio operation.

* * * * *